(12) United States Patent
Yamamoto et al.

(10) Patent No.: US 7,237,853 B2
(45) Date of Patent: Jul. 3, 2007

(54) SUPPORT ROLLER OF CRAWLER TYPE TRAVELING APPARATUS

(75) Inventors: Teiji Yamamoto, Hirakata (JP); Tuyosi Yosida, Hirakata (JP); Syouta Murakami, Hirakata (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 10/977,475

(22) Filed: Nov. 1, 2004

(65) Prior Publication Data

US 2005/0212358 A1    Sep. 29, 2005

(51) Int. Cl.
    *B62D 55/14*    (2006.01)
(52) U.S. Cl. .................. 305/136; 305/130; 305/139
(58) Field of Classification Search ........ 305/129–133, 305/136, 138–139, 124, 152, 154, 126
    See application file for complete search history.

(56) References Cited

U.S. PATENT DOCUMENTS

| 1,282,327 | A | * | 10/1918 | Turnbull ..................... 305/130 |
| 1,795,069 | A | * | 3/1931 | Baker ........................... 277/367 |
| 2,284,821 | A | * | 6/1942 | Heaslet ........................ 305/154 |
| 2,723,137 | A | * | 11/1955 | Bidwell ....................... 403/189 |
| 4,257,653 | A | * | 3/1981 | Meisel, Jr. et al. ......... 305/138 |
| 2006/0028066 | A1 | * | 2/2006 | Yamamoto .................. 305/139 |

FOREIGN PATENT DOCUMENTS

| JP | 402204184 A | * | 8/1990 | ................. 305/136 |
| JP | 2004-161043 | | 6/2004 | |

* cited by examiner

*Primary Examiner*—Jason R. Bellinger
(74) *Attorney, Agent, or Firm*—Armstrong, Kratz, Quintos, Hanson & Brooks, LLP

(57) ABSTRACT

The invention provides a support roller of a crawler type traveling apparatus which can prevent a rotational resistance from being increased by the soil or the like, and can stably achieve a function serving as the support roller for a long time. The invention provides a support roller of a crawler type traveling apparatus provided with a shaft (1), a support portion (2) supporting a center portion in an axial direction of the shaft (1), and a pair of rollers (3, 3) respectively arranged in both end portions (1a, 1a) of the shaft (1) and rotating together with the shaft (1). A mounting seat portion (36) of the support portion (2) to a track frame (51) is set within a range (S) of a roller outer shape formed by a pair of rollers (3, 3) in a plan view.

3 Claims, 8 Drawing Sheets

SUPPORT ROLLER OF CRAWLER TYPE TRAVELING APPARATUS

BACKGROUND OF THE INVENTION

1. Field of the Invention

The present invention relates to a support roller of a crawler type traveling apparatus.

2. Description of the Prior Art

A crawler type traveling apparatus (a chassis apparatus) has been conventionally structured, as shown in FIG. 6, such that a track frame 51, an idler 52 and a sprocket 53 are arranged approximately rectilinearly, support rollers 54 and 54 and track wheels 55, . . . are rotatably provided in the track frame 51, and a crawler belt 56 is wound around the idler 52, the support roller 54, the sprocket 53 and the track wheel 55. Further, the crawler belt 56 is provided with a plurality of crawler belt links 57, . . . , connection shafts 61, . . . pivotally connecting a plurality of links 57 in an endless manner, shoe plates 60, . . . (refer to FIG. 6) mounted to the links 57, . . . , and the like.

Further, the support roller 54 is provided with a shaft 65, and a roller 67 which is rotatably supported to the shaft 65 via bearings 66 and 66, for example, as shown in FIG. 7. The support roller is supported to the track frame 51 in a cantilever manner, and is structured such that one end portion of the shaft 65 is protruded from the roller 67, and a protruding portion 65a is supported to a mounting bracket 68 which is stood from the track frame 51. Further, a pair of collar portions 70 and 70 are provided in an outer peripheral surface of the roller 67. As shown in FIG. 8, when supporting the crawler belt 56 by the support roller, each of the links 57, . . . are brought into contact with an outer peripheral surface 67a of the roller 67 in an outer side (an outer side in a roller axial direction) of each of the collar portions 70 and 70.

Further, there is a structure in which the crawler belt is supported by a pair of rollers (for example, refer to patent document 1). In the structure described in the patent document 1, as shown in FIG. 8, a pair of mounting brackets 72 and 72 are stood from a track frame 73, and one end portions of shafts 74 and 74 are supported to the mounting brackets 72 and 72. Further, rollers 75 and 75 are rotatably supported to a side of inner end portions of the shafts 74 and 74 protruding from the mounting brackets 72 and 72, thereby supporting a crawler belt 76.

Patent Document 1

Japanese Utility Model Publication No. 1-25754 (pages 1 and 2 and FIG. 1)

By the way, in the structure in FIG. 7 mentioned above, in the case that the soil or the like comes down onto the track frame 51 from the crawler band 56, an open space is provided in an opposite side to the mounting bracket 68 because the support roller 54 is supported in a cantilever manner, so that the soil or the like comes down from the open space. However, the soil or the like is accumulated between the track frame 51 and the mounting bracket 68, in a side of the mounting bracket 68. Accordingly, there is a risk that a stable rotation can not be achieved due to an increase of a rotational resistance caused by a friction with respect to the accumulated soil or the like.

Further, in the structure shown in FIG. 8 mentioned above, there is a risk that the soil or the like is accumulated between the rollers 75 and 75 and the track frame 73, and the like. Accordingly, in the same manner as that shown in FIG. 7 mentioned above, there is a risk that a stable rotation can not be achieved due to an increase of a rotational resistance caused by the friction with respect to the soil or the like. Therefore, in the support roller shown in FIGS. 7 and 8 mentioned above, an outer shape of the support roller is frequently worn by the soil or the like accumulated near the support roller. Further, in the crawler band guided by the support roller, a wheel tread of the link is frequently worn. Further, since these elements are supported in the cantilever manner, comparatively great shear force and bending moment are applied to the shaft and the mounting bracket, and the shaft tends to be damaged.

SUMMARY OF THE INVENTION

The invention is made for the purpose of solving the conventional defect mentioned above, and an object of the invention is to provide a support roller of a crawler type traveling apparatus which can prevent a rotational resistance from being increased by the soil or the like, and can stably achieve a function serving as the support roller for a long time.

In accordance with a first aspect of the present invention, there is provided a support roller of a crawler type traveling apparatus comprising:

a shaft;

a support portion freely rotating the shaft and supporting a center portion in an axial direction thereof; and a pair of rollers respectively arranged in both end portions of the shaft and rotating together with the shaft, wherein a mounting portion of the support portion to a track frame is set within a range of a roller outer shape formed by a pair of rollers in a plan view.

Since the support roller of the crawler type traveling apparatus in accordance with the first aspect of the present invention is provided with the shaft, the support portion freely rotating the shaft and supporting the center portion in the axial direction thereof, and a pair of rollers respectively arranged in both end portions of the shaft and rotating together with the shaft, and the mounting portion of the support portion to the track frame is set within the range of the roller outer shape formed by a pair of rollers in a plan view, the mounting portion does not protrude from the outer end in the axial direction of the roller, and the mounting portion is in a state of being covered with the support roller in a lower position of the support roller. Accordingly, even in the case that the soil or the like comes down, the soil or the like is hard to be accumulated on the mounting portion and near the mounting portion. Therefore, the soil or the like is hard to make an intrusion into the support portion of the shaft, and it is possible to prevent the rotational resistance from being increased on the basis of the friction with the soil, whereby it is possible to achieve a stable rotation for a long time. Further, since the shaft is not supported in a cantilever manner but is supported by the center portion in the axial direction, the shear force and the bending moment are smaller than those in the case of the cantilever support, so that a durability is excellent in this view.

In accordance with a second aspect of the present invention, there is provided a support roller of a crawler type traveling apparatus comprising:

a shaft;

a support portion freely rotating the shaft and supporting a center portion in an axial direction thereof; and a pair of rollers respectively arranged in both end portions of the shaft and rotating together with the shaft, wherein a mounting hole for mounting the support portion to a track frame is set within a range of a roller outer shape formed by a pair of rollers in a plan view.

Since the support roller of the crawler type traveling apparatus in accordance with the second aspect of the present invention is provided with the shaft, the support portion freely rotating the shaft and supporting the center portion in the axial direction thereof, and a pair of rollers respectively arranged in both end portions of the shaft and rotating together with the shaft, and the mounting hole for mounting the support portion to the track frame is set within the range of the roller outer shape formed by a pair of rollers in a plan view, the mounting hole does not protrude from the outer end in the axial direction of the roller, and the soil or the like is also hard to be accumulated on the mounting hole and near the mounting portion in this case. Therefore, in the same manner as the support roller of the crawler type traveling apparatus in accordance with the first aspect mentioned above, the soil or the like is hard to make an intrusion into the support portion of the shaft, and it is possible to obtain the operation and effect such that a stable rotation can be achieved for a long time. Further, in this case, since the shaft is supported by the center portion in the axial direction, an excellent durability is obtained.

In accordance with a third aspect of the present invention, there is provided a support roller of a crawler type traveling apparatus comprising:

a shaft;

a support portion freely rotating the shaft and supporting a center portion in an axial direction thereof; and a pair of rollers respectively arranged in both end portions of the shaft and rotating together with the shaft, wherein a mounting portion of the support portion to a track frame or a center axis of a mounting hole for mounting the support portion to the track frame is set within a range between inner end surfaces of a pair of rollers, in an axial direction of the shaft.

Since the support roller of the crawler type traveling apparatus in accordance with the third aspect of the present invention is provided with the shaft, the support portion freely rotating the shaft and supporting the center portion in the axial direction thereof, and a pair of rollers respectively arranged in both end portions of the shaft and rotating together with the shaft, and the mounting portion of the support portion to the track frame or the center axis of the mounting for mounting the support portion to the track frame is set within the range between the inner end surfaces of a pair of rollers, in the axial direction of the shaft, the mounting portion does not protrude largely to a side of the roller over the inner end surfaces of the roller, and even in the case that the soil or the like makes an intrusion into the lower portion of the roller, the soil or the like is hard to be accumulated. Therefore, the soil or the like is hard to make an intrusion into the support portion of the shaft, and it is possible to prevent the rotational resistance from being increased on the basis of the friction with the soil, whereby it is possible to achieve a stable rotation for a long time. Further, since the shaft is supported by the center portion in the axial direction in this case, an excellent durability is achieved.

In accordance with a fourth aspect of the present invention, there is provided a support roller of a crawler type traveling apparatus, wherein an outer collar portion for controlling a displacement of a crawler link brought into contact with the roller in an axial direction of the shaft is provided in an outer end portion in an axial direction of an outer peripheral surface of the roller.

In the support roller of the crawler type traveling apparatus in accordance with the fourth aspect mentioned above, since the outer collar portion for controlling the displacement of the crawler link in the axial direction of the shaft is provided in the outer end portion in the axial direction of the roller, it is possible to secure a space of the mounting portion or the like for mounting to the track frame without being disturbed by the outer collar portion, and it is possible to securely control the displacement of the crawler link in the axial direction of the shaft.

DESCRIPTION OF THE PREFERRED EMBODIMENT

Figure 1:
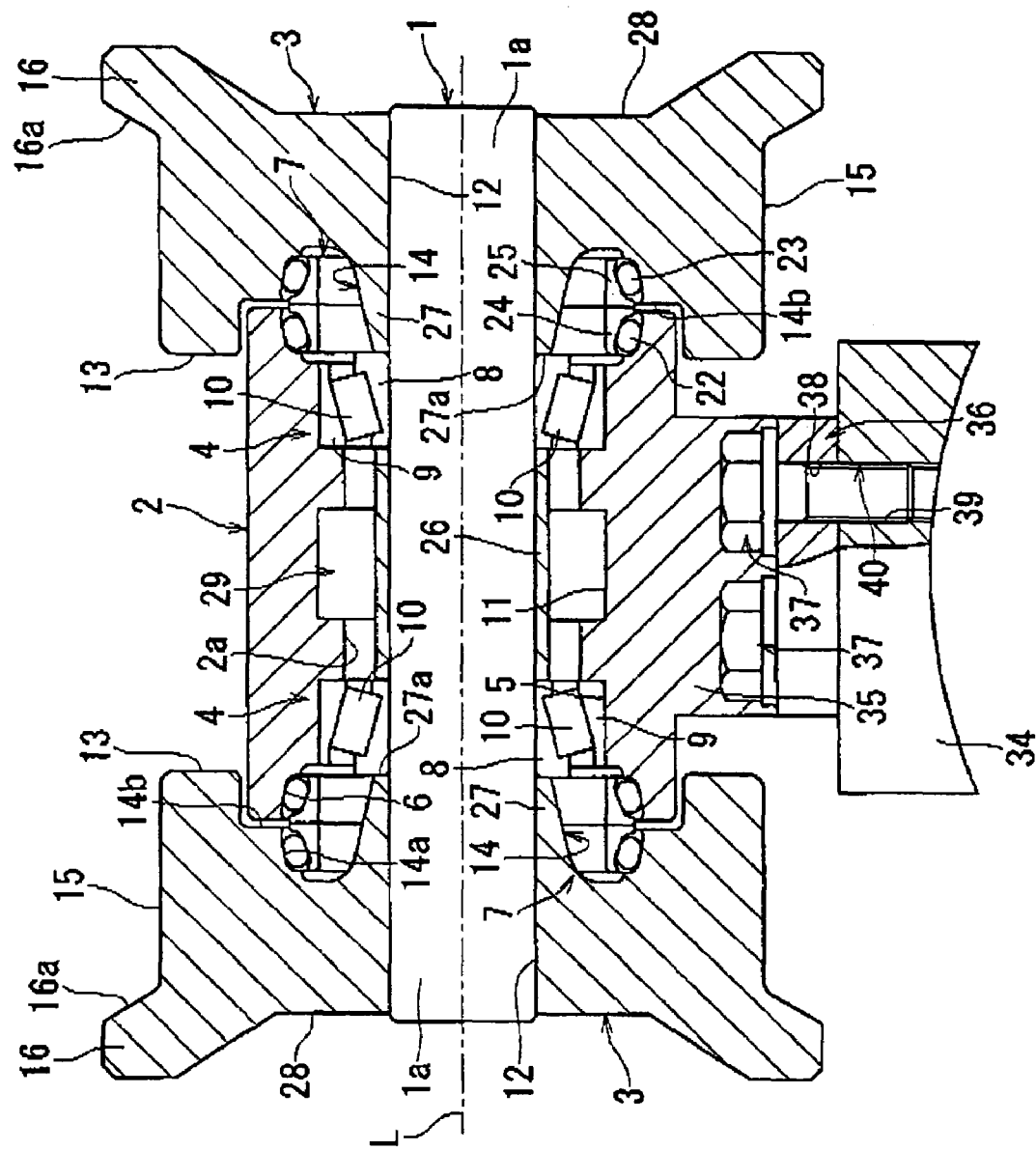
FIG. 1 is an enlarged cross sectional view showing an embodiment of a support roller of a crawler type traveling apparatus in accordance with the invention.
Figure 2:
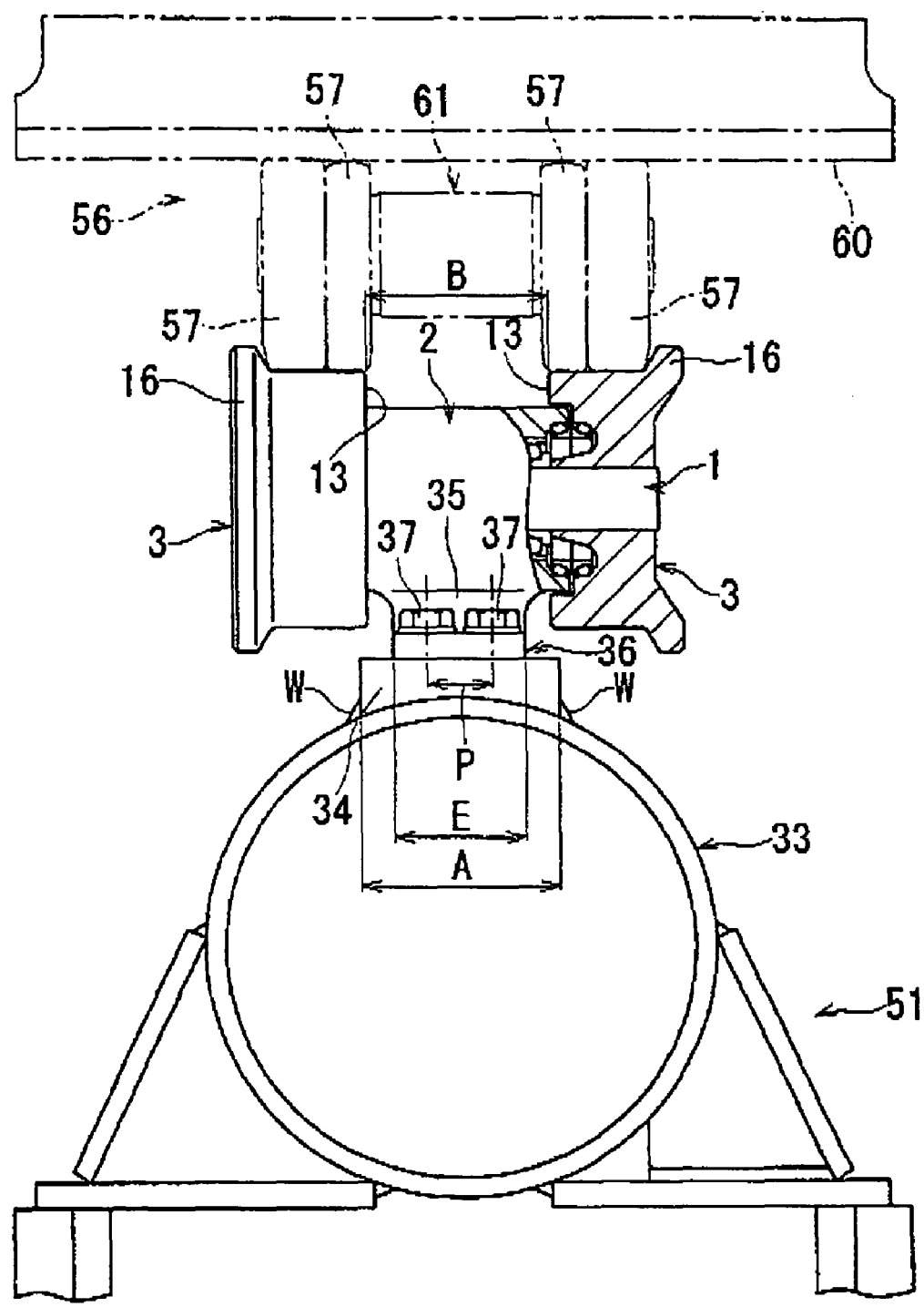
FIG. 2 is a partly cross sectional front elevational view showing a mounting state of the support roller of the crawler type traveling apparatus to a track frame.
Figure 6:
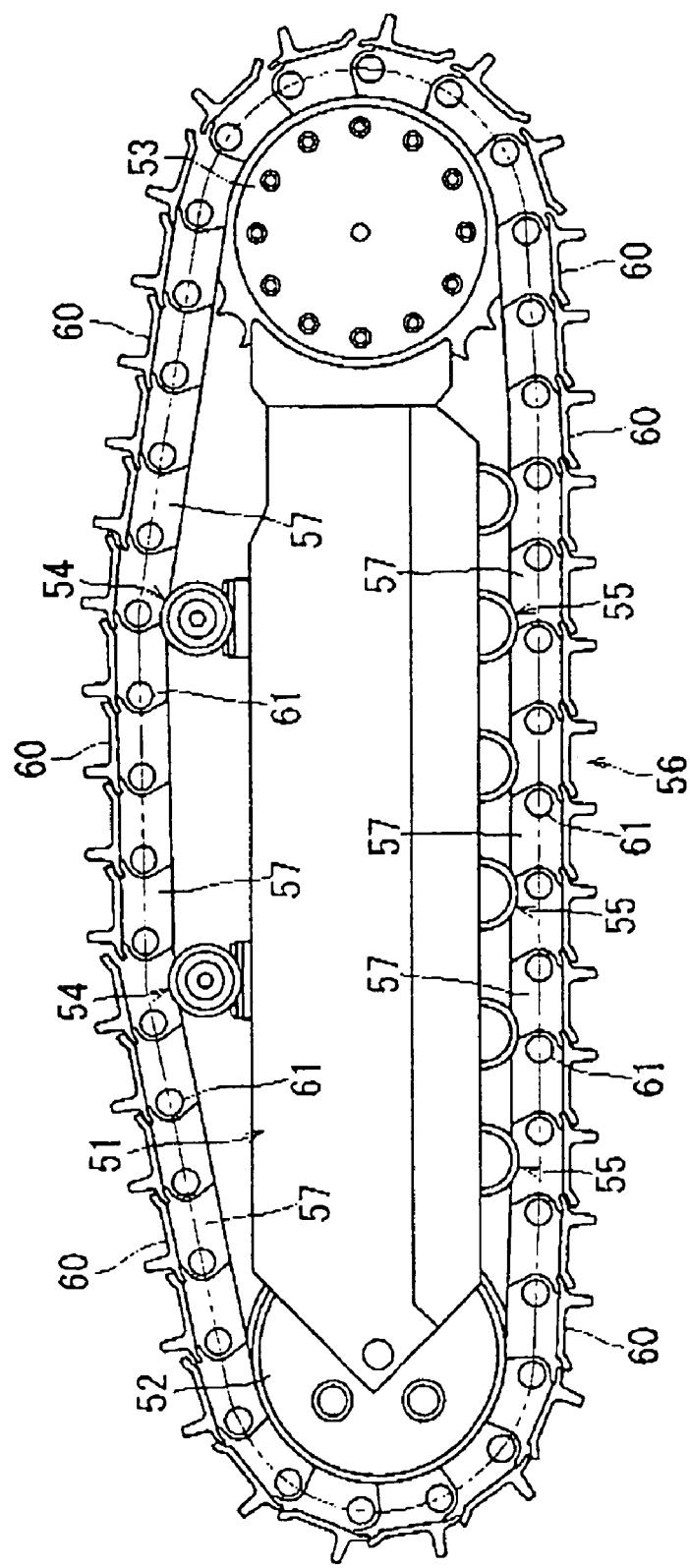
FIG. 6 is a side elevational view of a conventional crawler type traveling apparatus.
Figure 7:
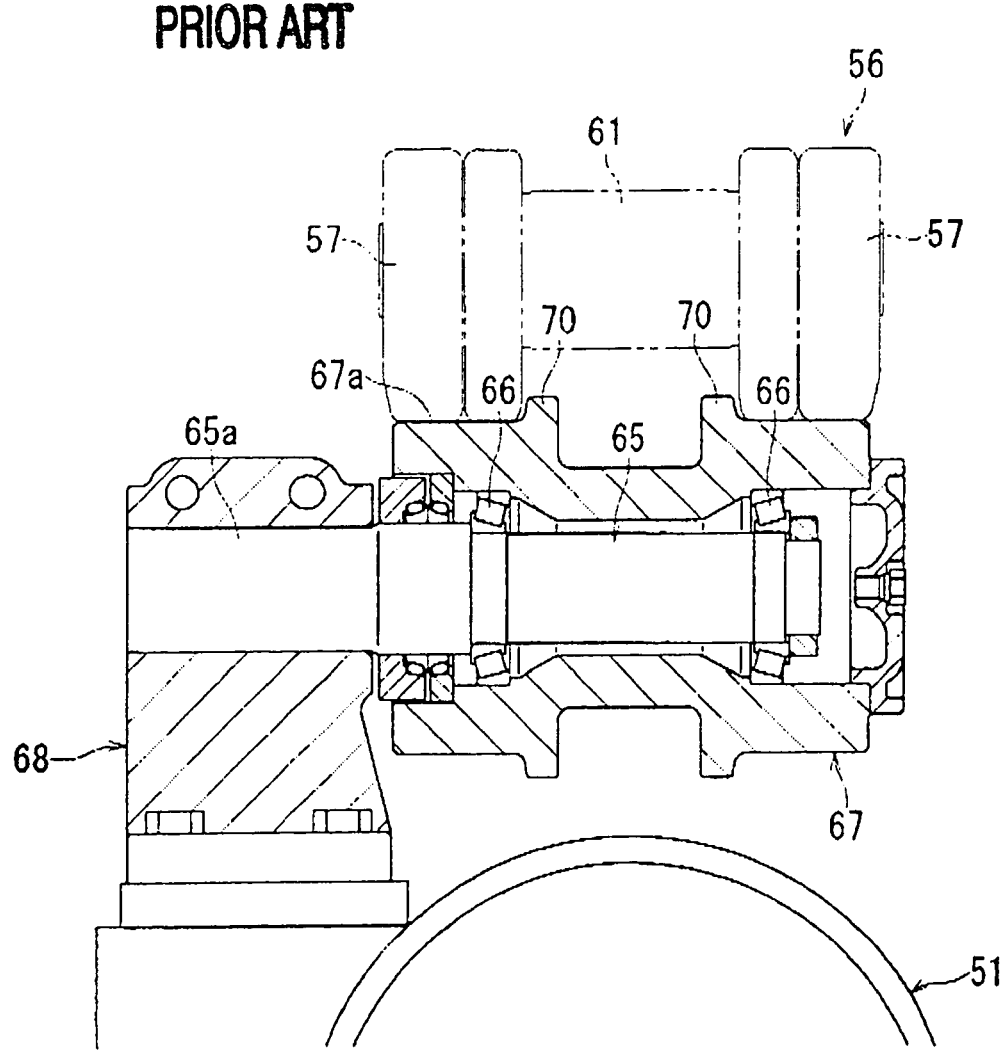
FIG. 7 is a cross sectional view of a support roller of the conventional crawler type traveling apparatus.
Figure 8:
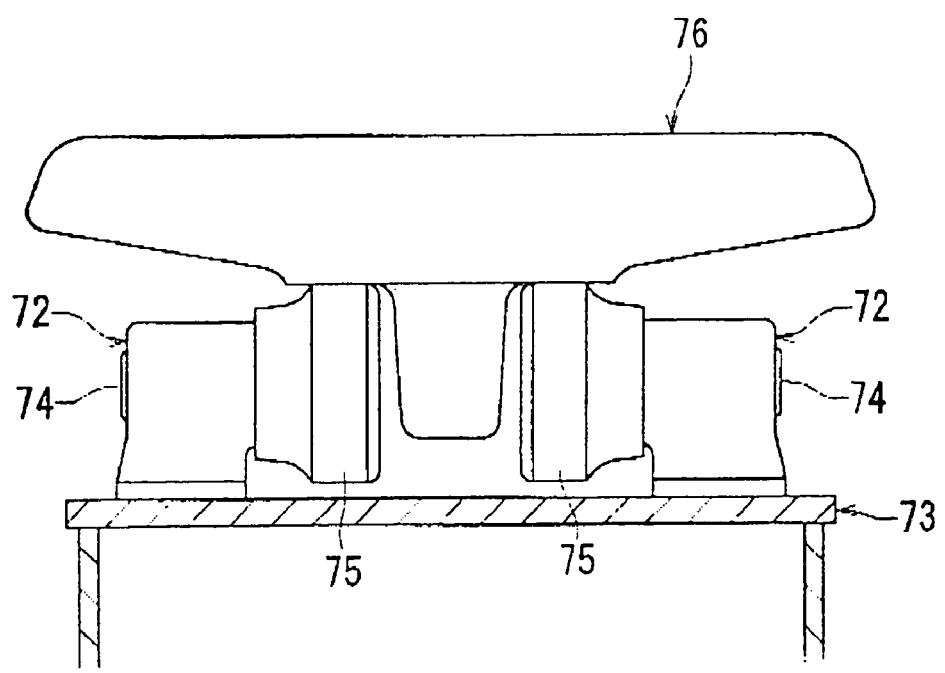
FIG. 8 is a brief view of a support roller of another conventional crawler type traveling apparatus.

A description will be in detail given next of a specific embodiment of a support roller of a crawler type traveling apparatus in accordance with the invention with reference to the accompanying drawings. FIG. 1 shows an enlarged cross sectional view of a support roller of a crawler type traveling apparatus in accordance with the invention, and FIG. 2 is a partly cross sectional front elevational view showing a mounting state to the crawler type traveling apparatus. In this case, the crawler type traveling apparatus is used, for example, in a construction machinery such as a bulldozer or the like and an agricultural machinery such as a rice harvesting machine or the like. The crawler type traveling apparatus is structured, in the same manner as the conventional crawler type traveling apparatus in FIG. 6, such that a track frame 51 is rotatably provided with support rollers 54 and 54 and track wheels 55, . . . , and a crawler band 56 is wound around an idler 52, the support roller 54, a sprocket 53 and the track wheel 55. Further, the crawler band 56 is provided with a plurality of links 57, . . . , connection shafts 61, . . . pivotally connecting the plurality of links 57, . . . in an endless manner, shoe plates 60, . . . mounted to the links 57, . . . , and the like.

Figure 3:
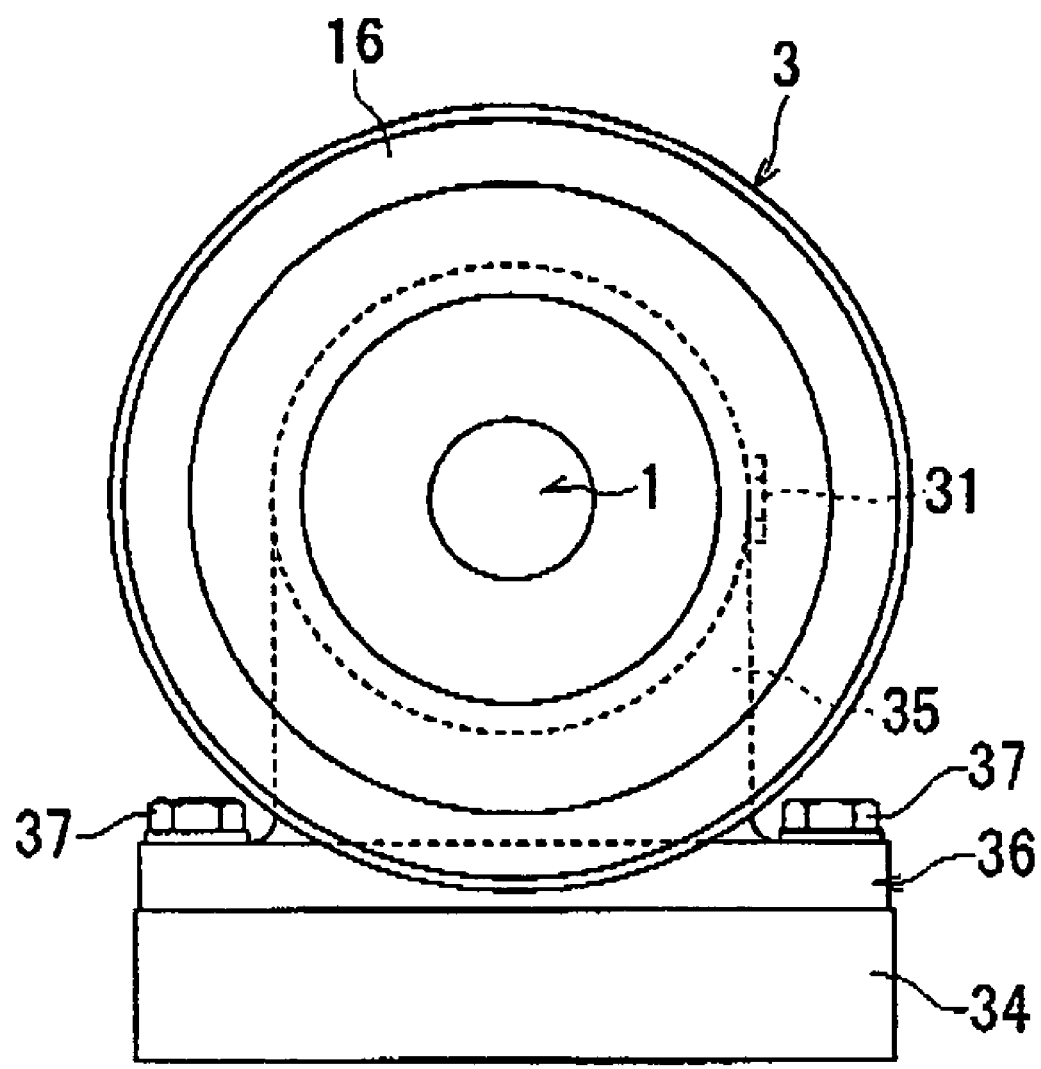
FIG. 3 is a side elevational view of the support roller of the crawler type traveling apparatus.

The support roller is provided with a shaft 1, a support portion 2 freely rotating the shaft 1 and supporting a center portion in an axial direction of the shaft 1, and a pair of rollers 3 and 3 respectively arranged in both end portions 1a and 1a of the shaft 1 and rotating together with the shaft 1, as shown in FIGS. 1, 2 and 3.

Further, the support portion 2 is constituted by a cylinder body, and a pair of bearing apparatuses 4 and 4 outside fitted to the shaft 1 are provided in an inner side of the support portion 2. In other words, a hole portion 2a in an axial portion of the support portion 2 is provided with middle-diameter portions 5 and 5 and large-diameter portions 6 and 6 in a side of an opening portion, the bearing apparatuses 4 and 4 are fitted to the middle-diameter portions 5 and 5, and fixed sides of floating seals 7 and 7 mentioned below are fitted to the large-diameter portions 6 and 6. In this case, the bearing apparatus 4 uses a conical roller bearing constituted by an inner race 8, an outer race 9 and a plurality of rollers 10, . . . interposed between the inner race 8 and the outer race 9. Axes of the rollers 10, . . . are directed to a center line L of the shaft 1 sequentially from an outer side toward an inner side. In this case, a concave peripheral groove 11 is formed in a center portion in an axial direction of the hole portion 2a of the support portion 2.

Further, each of the rollers 3 and 3 is constituted by a disc-like body having a center hole 12, a concave peripheral groove 14 is provided in an inner end surface of the roller, and an outer collar portion 16 is provided in an outer end portion in an axial direction of an outer peripheral surface 15 of the roller. In this case, the concave peripheral groove 14 is constituted by an inner portion 14a in an inner side and an outer portion 14b in an outer side, a rotating side of the floating seal 7 is fitted to the inner portion 14a, and an outer end portion in an axial direction of the support portion 2 is loosely fitted to the outer portion 14b.

The floating seal 7 has a fixed side seal ring 24 arranged in an outer end portion of the support portion 2, and a rotating side seal ring 25 arranged in the inner end portions of the rollers 3 and 3, and is further provided with O-rings 22 and 23 pressing both the seal rings 24 and 25 in a contacting direction.

Further, an inner end surface 16a of the outer collar portion 16 in the roller 3 is formed in an inclined surface which is sequentially enlarged from an inner side in an axial direction of the shaft toward an outer side. Further, as shown in FIG. 2, the outer surfaces of the crawler links 57 and 57 are brought into contact with the inner end surfaces 16a and 16a of the outer collar portions 16 and 16 in a state in which the crawler links 57, . . . are in contact with the outer peripheral surface 15 of the roller 3 and 3, that is, in a state in which the crawler band 56 is received by the support roller, whereby it is possible to control a displacement of the crawler links 57 and 57 in the axial direction of the shaft.

In this case, the spacer 26 is outside fitted to the center portion in the axial direction of the shaft 1 mentioned above, and the inner races 8 and 8 of the bearing apparatuses 4 and 4 are interposed between the spacer 26 and a leading end edge 27a of a cylinder portion 27 provided in an inner diameter side of the concave peripheral groove 14 of the roller 3. Accordingly, each of the bearing apparatuses 4 and 4 in which the outer race 9 is fitted to the middle-diameter portion 5 of the hole portion 2a in the support portion 2 is not displaced in the axial direction, but is inside fitted to the hole portion 2a of the support portion 2, thereby rotatably supporting the shaft 1.

Further, an outer diameter of the shaft 1 is set to be approximately the same diameter all along the length in the axial direction, and the end portions 1a and 1a of the shaft 1 are pressure inserted to the center holes 12 and 12 of the respective rollers 3. Accordingly, each of the rollers 3 integrally rotates with the shaft 1. In this case, concave depression portions 28 and 28 are provided in the outer end surface of the respective rollers 3 and 3, and are set such that the outer end surface of the shaft 1 does not protrude to an outer side in the axial direction from the concave depression portions 28 and 28.

Figure 4:
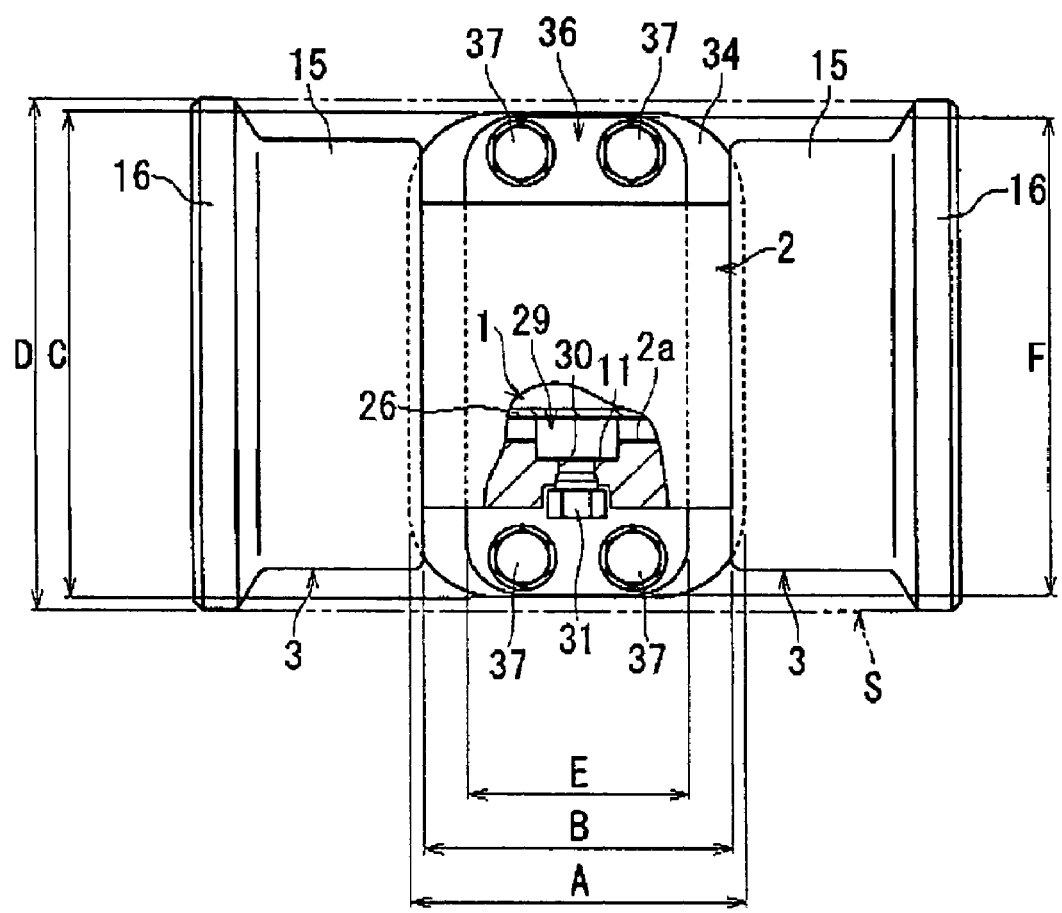
FIG. 4 is a plan view of the support roller of the crawler type traveling apparatus.

Further, an oil reservoir portion 29 in which an oil is filled is provided between an inner peripheral surface of the hole portion 2a of the support portion 2 and an outer peripheral surface of the shaft 1 (in specific, an outer peripheral surface of the spacer 26. In this case, as shown in FIG. 4, a communication hole 30 which is open in a lateral direction (a horizontal direction) and communicates with the concave peripheral groove 11 of the hole portion 2a of the support portion 2 is provided as shown in FIG. 4, and the oil is supplied to the oil reservoir portion 29 via the communication hole 30. Further, a screw-shaped plug member 31 for closing an opening portion of the communication hole 30 is attached (screwed) to the communication hole 30. In this case, the oil in the oil reservoir portion 29 lubricates the side of the floating seals 7 and 7 via the bearing apparatuses 4 and 4.

The support portion 2 has a bulge portion 35 provided in the outer peripheral portion of the support portion 2, and a mounting seat portion 36 (formed in an approximately rectangular shape in a plan view) corresponding to a mounting portion protruded from the bulge portion 35, as shown in FIGS. 1 to 4. Further, a base portion 34 (formed in an approximately rectangular shape in a plan view) is fixed to an upper portion of a frame body 33 constituted by a tube body of the track frame 51, and the mounting seat portion 36 is mounted to the base portion 34 via bolt members 37, . . . . In this case, in the base portion 34, a length A along the axial direction of the shaft is set to be approximately the same as an interval B between a pair of rollers 3 and 3, or the length A is set to be slightly longer than the interval B. Further, a length C in a direction orthogonal to the axial direction of the shaft of the base portion 34 (a traveling direction) is set to be slightly smaller than a maximum outer diameter D of the roller 3 (an outer diameter of the outer collar portion 16).

Further, a short side length E (a length along the axial direction of the shaft) of the mounting seat portion 36 is set to be smaller than the length A of the base portion 34, and a long side length F thereof (a length in a direction orthogonal to the axial direction of the shaft) is set to be approximately the same as the length C of the base portion 34. Further, the short side length E of the mounting seat portion 36 is set to be approximately the same as the interval B between a pair of rollers 3 and 3 (the size between the inner end surfaces 13 and 13), or the short side length E is set to be shorter than the interval B as illustrated.

Further, the mounting seat portion 36 is provided with through holes 38, . . . to which the bolt member 37 is inserted, as shown in FIG. 1, and the base portion 34 is provided with threaded holes 39, . . . with which the bolt member 37 is screwed. Accordingly, when screwing the bolt member 37 with the threaded hole 39 of the base portion 34 via the through hole 38 of the mounting seat portion 36, the mounting seat portion 36 can be mounted to the base portion 34, and the support roller can be mounted to the track frame 51.

Further, in the mounting state to the track frame 51, the mounting seat portion 36 of the support portion 2 mentioned above is set to be within a range S of the roller outer shape formed by a pair of rollers 3 and 3 in a plan view (as seen from a plane surface), as known from FIG. 4. In other words, the mounting seat portion 36 is set such as not to protrude from the end surfaces of the rollers 3 and 3 in the axial direction of the shaft, and such as not to protrude from a line obtained by drawing the maximum outer diameters of the rollers 3 and 3 in the traveling direction. In this case, the base portion 34 is fixed to the frame body 33 by a fixing means such as a welding or the like, and the base portion 34 including a weld portion W (refer to FIG. 2 and the like) is set to be within the range S. In specific, a bolt pitch P of the bolt members 37 and 37 screwed to mounting holes 40 and 40 provided along the axial direction is set to be approximately the same as the interval B between a pair of rollers 3 and 3, or the bolt pitch P is set to be shorter than the interval B as illustrated. As mentioned above, the mounting seat portion 36 mentioned above is interposed between a pair of rollers 3 and 3 in the plan view as shown in FIG. 4, and the mounting hole 40 (the hole formed by the through hole 38 and the threaded hole 39) for mounting the support portion 2 to the track frame 51 is arranged within a narrower range than the range S. In this case, if the mounting seat portion 36 is structured such as to be directly fixed to the frame body 33 of the track frame 51, the base portion 34 mentioned above can be omitted.

As mentioned above, the support roller mentioned above is provided with the shaft 1, the support portion 2 supporting the center portion in the axial direction of the shaft 1, and a pair of rollers 3 and 3 respectively arranged in both end portions 1a and 1a of the shaft 1 and rotating together with the shaft 1. Accordingly, since the shaft support portion or the like is not provided in the outer side in the axial direction of the rollers 3 and 3, the soil or the like does not come down further from the support roller so as to be accumulated on the support roller even in the case that the soil or the like comes down onto the support roller. Further, since the structure is made such that the mounting seat portion 36 of the support portion 2 to the track frame 51 is set within the range S of the roller outer shape formed by a pair of rollers 3 and 3 in the plan view, the mounting seat portion 36 does not protrude from the outer end in the axial direction of the rollers 3 and 3, and the mounting seat portion 36 is in a so-called covered state with the support roller in the lower position of the support roller. Accordingly, even in the case that the soil or the like comes down, the soil or the like is hard to be accumulated on the mounting seat portion 36 and near the mounting seat portion 36. In particular, since the mounting seat portion 36 in which the mounting hole 40 for mounting the support portion 2 to the track frame 51 is formed is arranged between the rollers 3 and 3 (in specific, the mounting portion 36 of the support portion 2 to the track frame 51 is set within the range between the inner end surfaces 13 and 13 of a pair of rollers 3 and 3 in the axial direction of the shaft 1, and the center axis of the mounting hole 40 for mounting the support portion 2 to the track frame 51 is set within the range between the inner end surfaces 13 and 13 thereby), the mounting portion 36 does not protrude largely to the side of the rollers 3 and 3 over the inner end surfaces 13 and 13 of the rollers 3 and 3, and the soil or the like is hard to be accumulated thereon even when the soil or the like makes an intrusion into the roller lower portion. Accordingly, the soil or the like is hard to make an intrusion into the support portion 2 of the shaft 1, it is possible to prevent the rotational resistance from being increased on the basis of the friction with the soil, and the outer abrasion of the support roller can be reduced. Further, even in the crawler band guided by the support roller, it is possible to reduce the abrasion of the wheel tread of the link, and it is possible to stably rotate for a long time. Further, an entire structure is simple, and the number of the parts is reduced, thereby contributing to a weight saving and a reduction of a manufacturing cost. Further, it is possible to intend to simplify the track frame 51 to which the support roller is mounted. Further, since the shaft 1 is supported to the center portion in the axial direction in spite of being supported in a cantilever manner, the shear force and the bending moment are small in comparison with the cantilever support, and an excellent durability can be obtained in this view.

Further, since the outer collar portion 16 controlling the displacement of the crawler link 57 in the axial direction of the shaft is provided in the outer end portion in the axial direction of the roller 3, it is possible to secure the space of the mounting seat portion 36 or the like for mounting to the track frame 51 without being disturbed by the outer collar portion 16, and it is possible to securely control the displacement of the crawler link 57 in the axial direction of the shaft.

Further, since the conical roller bearing is used in the bearing apparatus 4, it is possible to receive a radial load and a thrust load, and further a combined load thereof, and the rollers 3 and 3 smoothly rotate. Further, since the outer diameter of the shaft 1 is set to be approximately the same diameter all along the length in the axial direction, and the end portions 1a and 1a thereof are pressure inserted to the center holes 12 and 12 of the respective rollers 3 and 3, the shaft 1 can be easily manufactured, and the shaft 1 can be easily and securely assembled in the respective rollers 3 and 3. Further, since the floating seal 7 is used in the seal apparatus, it is possible to achieve an accurate seal function.

Figure 5:
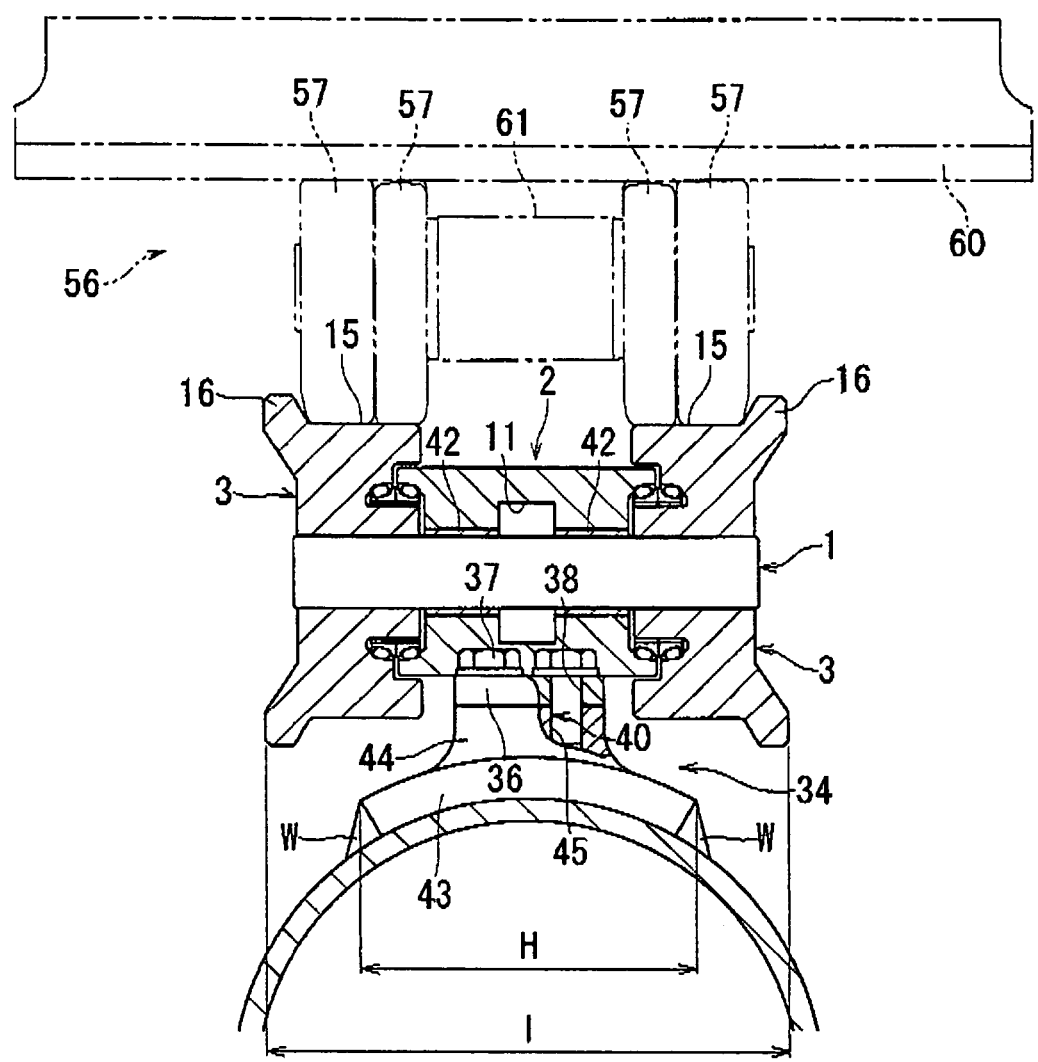
FIG. 5 is a cross sectional view of another embodiment of the support roller of the crawler type traveling apparatus.

Next, FIG. 5 shows another embodiment. In this case, the bearing apparatus 4 does not employ the conical roller bearing, but employs bush type slidable bearings 42 and 42. Accordingly, as is different from the support roller shown in FIG. 1 mentioned above, the hole portion 2a of the support portion 2 is provided only with the concave groove 11 in the center portion in the axial direction thereof, and the bush type slidable bearings 42 and 42 are outside fitted to the shaft 1 with holding the concave groove 11 therebetween.

In this case, the base portion 34 fixed to the track frame 51 has a pedestal portion 43 formed in a circular arc cross sectional shape (formed in an approximately rectangular shape in a plan view), and a protruding portion 44 (formed in an approximately rectangular shape in a plan view) connected to an upper portion of the pedestal portion 43, and the mounting seat portion 36 in a side of the support portion 2 is mounted via the bolt members 37, . . . in the same manner as that of the support roller shown in FIG. 1 mentioned above. In other words, threaded holes 45, . . . are provided in the protruding portion 44, and the support portion 2 is mounted to the track frame 51 by screwing the bolt member 37 to the threaded hole 45 of the protruding portion 44 via the through hole 38 of the mounting seat portion 36. Accordingly, the mounting hole 40 for mounting the support portion 2 to the track frame 51 is formed by the through hole 38 of the mounting seat portion 36 and the threaded hole 45 of the protruding portion 44.

Further, a short side length H (a length along the axial direction of the shaft) of the pedestal portion 43 is set to be shorter than a length I of the support roller, and a long side length (a length along the direction orthogonal to the axial direction of the shaft) is set to be slightly shorter than a maximum outer diameter D of the roller 3 (refer to FIG. 4). Further, a short side length (a length along the axial direction of the shaft) of the protruding portion 44 is set to be shorter than the short side length of the pedestal portion 43, and a long side length (a length along the direction orthogonal to the axial direction of the shaft) is set to be approximately the same as the long side length of the pedestal portion 43.

In other words, in this case, in the plan view, the structure is made such that the mounting seat portion 36 of the support portion 2 to the track frame 51 is interposed between a pair of rollers 3 and 3 mentioned above, and set within the range S of the roller outer shape (refer to FIG. 4). Accordingly, the structure is made such that the mounting seat portion 36, the mounting hole 40 by extension, does not protrude from the outer end in the axial direction of the rollers 3 and 3. Further, the structure is made such that the pedestal portion 43 of the base portion 34, the weld portion W for fixing the pedestal portion 43 to the frame body 33, and the like do not protrude from the range S in the plan view. In this case, since the support roller in FIG. 5 is approximately the same structure as that of the support roller in FIG. 1 mentioned above, the same reference numerals are attached to the same members and a description thereof will be omitted. Further, even in this case, the base portion 34 can be omitted by directly fixing the mounting seat portion 36 to the frame body 33 of the track frame 51.

Since the support roller in FIG. 5 has the same structure as that of the support roller in FIG. 1 mentioned above except the bush type slidable bearing 42 used in the bearing apparatus 4, the same operation and effect as those of the support roller in FIG. 1 can be achieved. Further, since the bearing apparatus 4 employs the bush type slidable bearing 42, it is possible to simplify the shape or the like of the hole portion 2a of the support portion 2, and it is possible to easily assemble. Further, a cost reduction can be achieved by not using the conical roller bearing.

The description is given above of the specific embodiments of the roller of the crawler type traveling apparatus in accordance with the invention, however, the invention is not limited to the embodiments mentioned above, and can be variously modified within the scope of the invention. For example, the mounting seat portion 36 serving as the mounting portion may be structured such that at least the mounting hole 40 is set within the range S of the roller outer shape formed by a pair of rollers 3 and 3 in the plan view, and a part thereof may protrude from the range S. Further, a part of the base portion 34 receiving the mounting seat portion 36 may protrude from the range S. Further, even in the case that the mounting portion (the mounting seat portion) 36 or the center axis of the mounting hole 40 is set within the range between the inner end surfaces 13 and 13 of a pair of rollers 3 and 3, the mounting portion 36 or the center axis of the mounting hole 40 may protrude from the range S mentioned above in the direction (the traveling direction) orthogonal to the axial direction of the shaft 1. Further, the number of the mounting hole 40 can be freely set, and the bearing apparatus 4 is not limited to the conical roller bearing or the bush bearing, and may employ various bearings as far as the bearing can rotatably support the shaft 1 to the supporting portion 2. Further, the frame body 33 of the track frame 51 to which the base portion 34 is mounted, is not limited to the cylinder pipe, but may be constituted, for example, by a rectangular column body or the like.

What is claimed is:

1. A support roller of a crawler type traveling apparatus comprising:
    a shaft;
    a support portion allowing free rotation of the shaft and supporting a center portion of said shaft in an axial direction thereof; and
    a pair of rollers respectively arranged on both end portions of the shaft and rotating together with the shaft, said each pair of rollers having an outer collar portion on an outer end portion in an axial direction of an outer peripheral surface of the roller,
    does not extend beyond the periphery formed by said pair of rollers in a top plan view, and said mounting portion is positioned between inner end surfaces of said pair of rollers in an axial direction of said shaft.

2. A support roller of a crawler type traveling apparatus comprising:
    a shaft;
    a support portion allowing free rotation of the shaft and supporting a center portion of said shaft in an axial direction thereof; and
    a pair of rollers respectively arranged on both end portions of the shaft and rotating together with the shaft, said each pair of rollers having an outer collar portion on an outer end portion in an axial direction of an outer peripheral surface of the roller,
    does not extend beyond the periphery formed by said pair of rollers in a top plan view, and said mounting hole is positioned between inner end surfaces of said pair of rollers, in an axial direction of said shaft.

3. A support roller of a crawler type traveling apparatus comprising:
    a shaft;
    a pair of rollers respectively arranged on both end portions of the shaft and rotating with the shaft, and
    a support portion having a cylindrical body and a mounting portion, said cylindrical body allowing free rotation of the shaft and supporting a center portion of said shaft in an axial direction of said shaft and extending between said pair of rollers, said mounting portion for mounting on a track frame,
    does not extend beyond the periphery formed by said pair of rollers in a top plan view, and said mounting portion is positioned between inner end surfaces of said pair of rollers in an axial direction of said shaft.

\* \* \* \* \*